US006941702B1

(12) United States Patent
Abrams et al.

(10) Patent No.: US 6,941,702 B1
(45) Date of Patent: Sep. 13, 2005

(54) RAINWATER COLLECTION AND DISPENSATION SYSTEM

(76) Inventors: Lyndon Abrams, 4808 Malarkey St., Orlando, FL (US) 32808; Priscilla Abrams, 4808 Malarkey St., Orlando, FL (US) 32808

( * ) Notice: Subject to any disclaimer, the term of this patent is extended or adjusted under 35 U.S.C. 154(b) by 0 days.

(21) Appl. No.: 10/341,070

(22) Filed: Jan. 14, 2003

(51) Int. Cl.$^7$ ............................................. E04D 13/08
(52) U.S. Cl. ........................ 52/16; 137/357; 137/376; 239/20; 239/207; 239/208; 239/302; 239/379; 108/25; 108/26
(58) Field of Search .................... 52/16, 12; 248/48.2; 137/357, 376, 587; 239/20, 207, 208, 302, 239/379; 108/25, 26; 169/16, 48, 49

(56) References Cited

U.S. PATENT DOCUMENTS

| | | | | |
|---|---|---|---|---|
| 1,460,613 A | * | 7/1923 | Sill | ............................. 137/373 |
| 1,907,299 A | * | 5/1933 | Kudolla | ........................ 137/204 |
| 4,052,975 A | * | 10/1977 | Ceideburg | ................... 126/572 |
| 4,115,879 A | | 9/1978 | Toms | |
| 4,162,218 A | | 7/1979 | McCormick | |
| 4,934,404 A | * | 6/1990 | DeStefano | ................... 137/357 |
| 5,039,407 A | | 8/1991 | Mohrman | |
| 5,220,755 A | | 6/1993 | Roles | ............................. 52/16 |
| D353,436 S | | 12/1994 | Hess | |
| 5,437,138 A | * | 8/1995 | Tuohey et al. | ............. 52/741.1 |
| 5,573,677 A | | 11/1996 | Dembrosky | |
| 5,730,179 A | * | 3/1998 | Taylor | ......................... 137/357 |
| 5,862,632 A | * | 1/1999 | Zima | ............................. 52/16 |
| 5,868,319 A | * | 2/1999 | Gilmore | ...................... 239/290 |
| 5,931,118 A | | 8/1999 | Thompson | |
| 6,041,556 A | * | 3/2000 | Keller | ............................ 52/11 |
| 6,397,526 B1 | * | 6/2002 | Saul et al. | ...................... 52/16 |
| 6,526,699 B1 | * | 3/2003 | Foglio, Sr. | ...................... 52/15 |
| 6,561,387 B1 | * | 5/2003 | Slawson | ...................... 137/360 |
| 6,647,670 B1 | * | 11/2003 | Dran | ............................. 52/16 |

FOREIGN PATENT DOCUMENTS

JP     02003155761 A  * 11/2001   ............. E03B 3/03

\* cited by examiner

Primary Examiner—Carl D. Friedman
Assistant Examiner—Nahid Amiri

(57) ABSTRACT

A rainwater collection and dispensation system for economically conserving water usage by using collected rainwater. The rainwater collection and dispensation system includes a gutter being adapted to be mounted along an edge of a roof of a building structure; and also includes a tank support member being adapted to rest upon a ground and being disposed beneath a portion of the gutter; and further includes a tank being securely and removably supported upon the tank support member; and also includes a drainage spout interconnecting the gutter and the tank for draining rainwater from the gutter into the tank; and further includes a rainwater dispensing assembly including an overflow pipe member being disposed through a wall of the tank for draining rainwater from the tank.

2 Claims, 2 Drawing Sheets

RAINWATER COLLECTION AND DISPENSATION SYSTEM

BACKGROUND OF THE INVENTION

1. Field of the Invention

The present invention relates to rainwater collection and dispensation assemblies and more particularly pertains to a new rainwater collection and dispensation system for economically conserving water usage by using collected rainwater.

2. Description of the Prior Art

The use of rainwater collection and dispensation assemblies is known in the prior art. More specifically, rainwater collection and dispensation assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,573,677; U.S. Pat. No. 5,039,407; U.S. Pat. No. 4,115,879; U.S. Pat. No. 5,931,118; U.S. Pat. No. 4,162,218; and U.S. Patent No. Des. 353,436.

While these devices fulfill their respective, particular objectives and requirements, the aforementioned patents do not disclose a new rainwater collection and dispensation system. The prior art includes tanks and pumps for pumping water from the tanks for selected uses.

SUMMARY OF THE INVENTION

The general purpose of the present invention, which will be described subsequently in greater detail, is to provide a new rainwater collection and dispensation system which has many of the advantages of the rainwater collection and dispensation assemblies mentioned heretofore and many novel features that result in a new rainwater collection and dispensation system which is not anticipated, rendered obvious, suggested, or even implied by any of the prior art rainwater collection and dispensation assemblies, either alone or in any combination thereof. The present invention includes a gutter being adapted to be mounted along an edge of a roof of a building structure; and also includes a tank support member being adapted to rest upon a ground and being disposed beneath a portion of the gutter; and further includes a tank being securely and removably supported upon the tank support member; and also includes a drainage spout interconnecting the gutter and the tank for draining rainwater from the gutter into the tank; and further includes a rainwater dispensing assembly including an overflow pipe member being disposed through a wall of the tank for draining rainwater from the tank. None of the prior art includes the combination of the elements of the present invention.

There has thus been outlined, rather broadly, the more important features of the rainwater collection and dispensation system in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new rainwater collection and dispensation system which has many of the advantages of the rainwater collection and dispensation assemblies mentioned heretofore and many novel features that result in a new rainwater collection and dispensation system which is not anticipated, rendered obvious, suggested, or even implied by any of the prior art rainwater collection and dispensation assemblies, either alone or in any combination thereof.

Still another object of the present invention is to provide a new rainwater collection and dispensation system for economically conserving water usage by using collected rainwater.

Still yet another object of the present invention is to provide a new rainwater collection and dispensation system that is easy and convenient to set up and use.

Even still another object of the present invention is to provide a new rainwater collection and dispensation system that uses rainwater for irrigation purposes and also for toilets.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
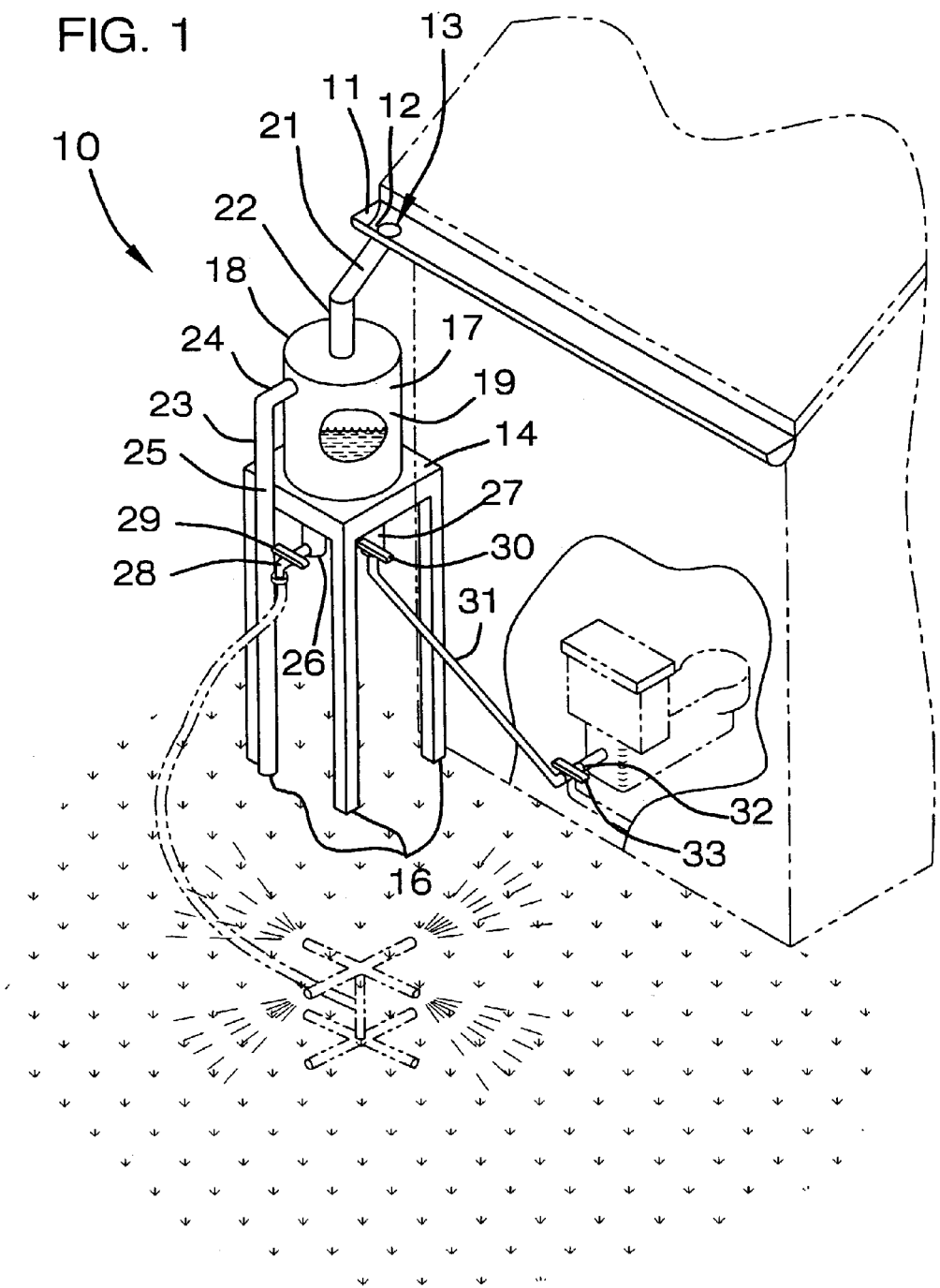
FIG. 1 is a perspective view of a new rainwater collection and dispensation system according to the present invention.
Figure 2:
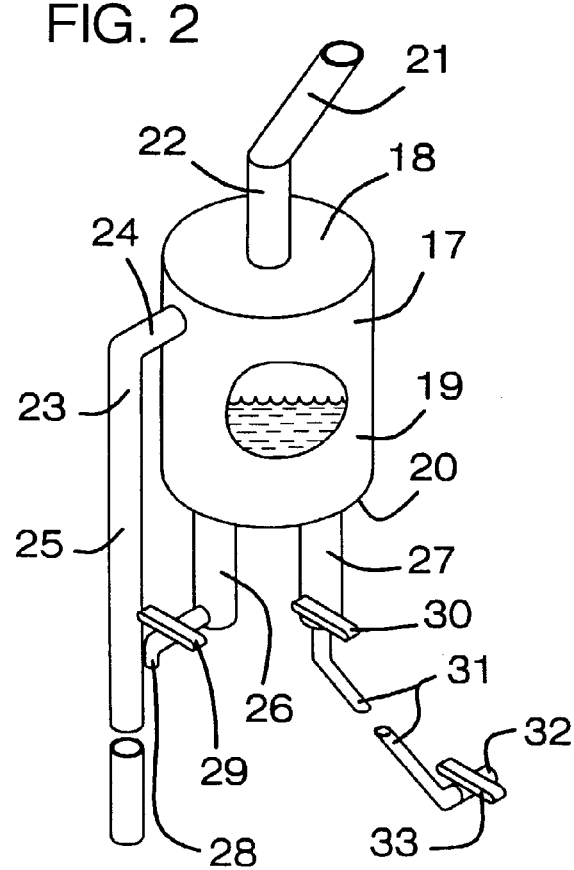
FIG. 2 is a perspective view of the tank, conduits, and spigots of the present invention.
Figure 3:
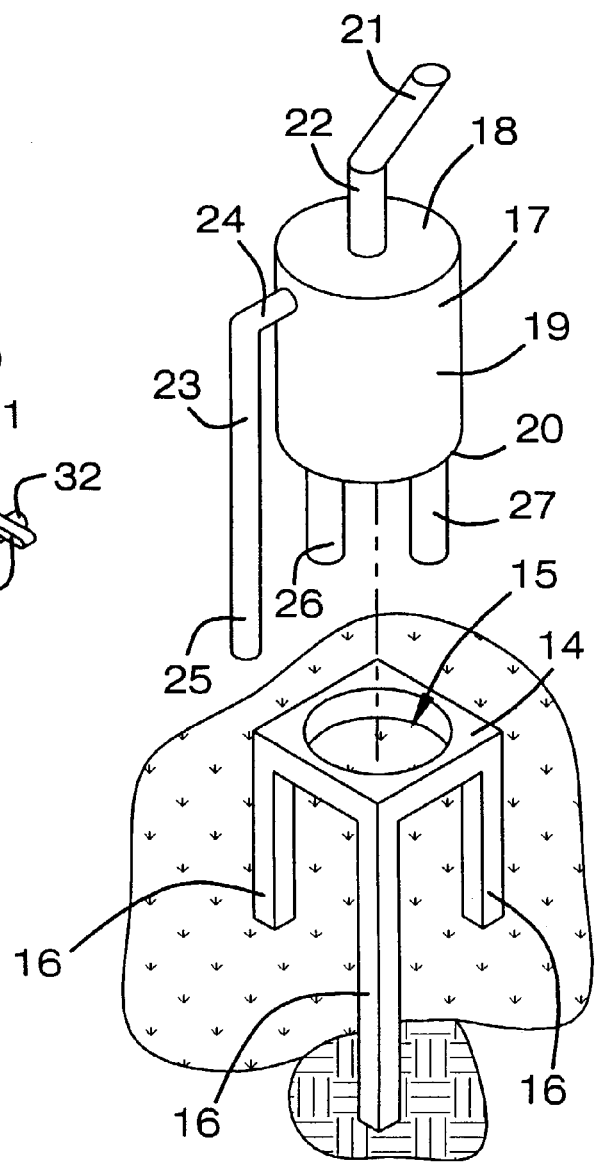
FIG. 3 is an exploded perspective view of the tank support member, tank, and conduits of the present invention.

With reference now to the drawings, and in particular to FIGS. 1 through 3 thereof, a new rainwater collection and dispensation system embodying the principles and concepts of the present invention and generally designated by the reference numeral 10 will be described.

As best illustrated in FIGS. 1 through 3, the rainwater collection and dispensation system 10 generally comprises a gutter 11 being adapted to be conventionally mounted along an edge of a roof of a building structure. The gutter 11 is a trough having an elongate bottom wall 12 and a drainage hole 13 being disposed through the bottom wall 12 near and end thereof.

A tank support member is adapted to rest upon a ground and is disposed beneath a portion of the gutter 11. The tank support member includes a stand having a platform 14 and having a plurality of leg members 16 being conventionally attached to the platform 14 for standing upon a ground. The platform 14 includes a tabletop having an opening 15 being centrally disposed therethrough. A tank 17 is securely and removably supported upon the tank support member. The tank 17 is securely and removably disposed upon the platform 14 and has top, side, and bottom walls 18–20.

A drainage spout 21,22 interconnects the gutter 11 and the tank 17 for draining rainwater from the gutter 11 into the tank 17. The drainage spout 21,22 includes a first pipe 21 being conventionally attached about the drainage hole 13 of the gutter 11, and also includes a second pipe 22 being conventionally attached to the first pipe 21 and being disposed through the top wall 18 of the tank 17 for transporting rainwater from the gutter 11 into the tank 17.

A rainwater dispensing assembly includes an overflow pipe member 23 being conventionally disposed through the side wall 19 of the tank 17 for draining rainwater from the tank 17. The overflow pipe member 23 has an end portion 24 which is disposed through the side wall 19 of the tank 17 and also has an elongate main portion 25 which is angled relative to the end portion 24 and which is adapted to be directed downwardly to the ground. The rainwater dispensing assembly also includes rainwater dispensing pipe members 26,27 being conventionally disposed through the bottom wall 20 of the tank 17 and extending downwardly therefrom and being disposed through the opening 15 of the platform 14. The rainwater dispensing assembly further includes a spigot assembly being conventionally attached near an outer end of the first rainwater dispensing pipe member 26 and including a spigot 28 and a first valve member 29 being conventionally attached to the spigot 28 for opening and closing flow of rainwater through the spigot 28. The rainwater dispensing assembly also includes a second valve member 30 being conventionally attached to an outer end of the second rainwater dispensing pipe member 27, and further includes a water line 31 having a first end which is conventionally attached to the second rainwater dispensing pipe member 27, and also includes a diversion valve assembly 33 being conventionally attached to a second end of the water line 31. The diversion valve assembly 33 includes a tubular connector 32 being conventionally attached to the second end of the water line 31 and being adapted to be attached to another water line, and also includes a diversion valve member 33 being conventionally attached to the tubular connector 32 for diverting rainwater through the water lines.

In use, rainwater is collected in the gutter 11 and is drained therefrom into the tank 17 through the drainage spout 21,22. The rainwater contained in the tank 17 can be used for various purposes including irrigation the lawn with the user attaching a garden hose and sprinkler to the spigot 28 and turning open the first valve member 29, and the user can also attach the water line 31 to the water line leading to the toilet tank and can close the water line to the toilet tank by using the diversion valve member 33 and can allow rainwater from the tank 17 to enter the toilet tank by opening the second valve member 30.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the rainwater collection and dispensation system. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A rainwater collection and dispensation system comprising:
    a gutter being adapted to be mounted along an edge of a roof of a building structure, said gutter being a trough having an elongate bottom wall and a drainage hole being disposed through said bottom wall near and end thereof;
    a tank support member being adapted to rest upon a ground and being disposed beneath a portion of said gutter, said tank support member including a stand having a platform and having a plurality of leg members being attached to said platform for standing upon a ground, said platform including a tabletop having an opening being centrally disposed therethrough;
    a tank being securely and removably supported upon said tank support member, said tank being securely and removably disposed upon said platform and has top, side, and bottom walls;
    a drainage spout interconnecting said gutter and said tank for draining rainwater from said gutter into said tank, said drainage spout including a first pipe being attached about said drainage hole of said gutter, and also including a second pipe being attached to said first pipe and being disposed through said top wall of said tank for transporting rainwater from said gutter into said tank; and
    a rainwater dispensing assembly including an overflow pipe member being disposed through a wall of said tank for draining rainwater from said tank, said overflow pipe member having an end portion which is disposed through said side wall of said tank and also having an elongate main portion which is angled relative to said end portion and which is adapted to be directed downwardly to the ground, said rainwater dispensing assembly also including rainwater dispensing pipe members being disposed through said bottom wall of said tank and extending downwardly therefrom and being disposed through said opening of said platform, said rainwater dispensing assembly further including a spigot assembly being attached near an outer end of a first said rainwater dispensing pipe member and including a spigot and a first valve member being attached to said spigot for opening and closing flow of rainwater through said spigot, said rainwater dispensing assembly also including a second valve member being attached to an outer end of a second said rainwater dispensing pipe member, and further including a water line having a first end which is attached to said second rainwater dispensing pipe member, and also including a diversion valve assembly being attached to a second end of said water line.

2. A rainwater collection and dispensation system as described in claim 1, wherein said diversion valve assembly includes a tubular connector being attached to said second end of said water line and being adapted to be attached to another water line, and also includes a diversion valve member being attached to said tubular connector for diverting rainwater through the water lines.

* * * * *